(12) United States Patent
Yamada

(10) Patent No.: US 11,308,003 B2
(45) Date of Patent: Apr. 19, 2022

(54) COMMUNICATION DEVICE AND METHOD FOR COMMUNICATION BETWEEN TWO CONTROL DEVICES IN A VEHICLE

(71) Applicant: TOYOTA JIDOSHA KABUSHIKI KAISHA, Toyota (JP)

(72) Inventor: Akiyoshi Yamada, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/936,507

(22) Filed: Jul. 23, 2020

(65) Prior Publication Data

US 2021/0089474 A1 Mar. 25, 2021

(30) Foreign Application Priority Data

Sep. 20, 2019 (JP) .............................. JP2019-171418

(51) Int. Cl.
*G06F 13/12* (2006.01)
*G06F 7/58* (2006.01)

(52) U.S. Cl.
CPC .............. *G06F 13/12* (2013.01); *G06F 7/588* (2013.01); *G06F 2213/40* (2013.01)

(58) Field of Classification Search
CPC ................. G06F 13/12; G06F 2213/40; G06F 2213/0052; G06F 13/42; G06F 13/4295
See application file for complete search history.

(56) References Cited

U.S. PATENT DOCUMENTS

| | | | | |
|---|---|---|---|---|
| 6,467,065 | B1 * | 10/2002 | Mendez | G05B 19/0421 710/31 |
| 7,603,501 | B2 * | 10/2009 | Hsieh | G06F 13/4291 710/110 |
| 8,601,190 | B2 * | 12/2013 | Pipho | G06F 13/364 710/110 |
| 8,874,816 | B2 * | 10/2014 | Tailliet | G06F 13/4295 710/110 |
| 9,411,758 | B2 * | 8/2016 | Yamashita | G06F 1/32 |
| 9,871,867 | B2 * | 1/2018 | Ryu | H04L 12/403 |
| 10,678,726 | B2 * | 6/2020 | Rennig | G06F 13/362 |
| 2011/0197000 | A1 * | 8/2011 | Hsieh | G06F 13/42 710/110 |
| 2014/0324278 | A1 * | 10/2014 | Teng | G06Q 10/20 701/31.5 |
| 2016/0103773 | A1 * | 4/2016 | Sauer | G06F 13/4282 710/110 |
| 2021/0021441 | A1 * | 1/2021 | Nishikawa | B60W 50/00 |

FOREIGN PATENT DOCUMENTS

| | | |
|---|---|---|
| JP | 2007-92640 A | 4/2007 |
| JP | 2017-092640 A | 5/2017 |

* cited by examiner

*Primary Examiner* — Raymond N Phan
(74) *Attorney, Agent, or Firm* — Oliff PLC

(57) ABSTRACT

A communication device for a vehicle includes: a memory; and a processor that is coupled to the memory, the processor being configured to: generate a first address for a time at which a first control device, which carries out control of a vehicle, communicates with a second control device, carry out communication with the second control device via the first address, and receive, from the second control device, information that specifies the first control device, and on the basis of the information that is received, set, in place of the first address, a second address that corresponds to an instrument that the first control device controls.

11 Claims, 4 Drawing Sheets

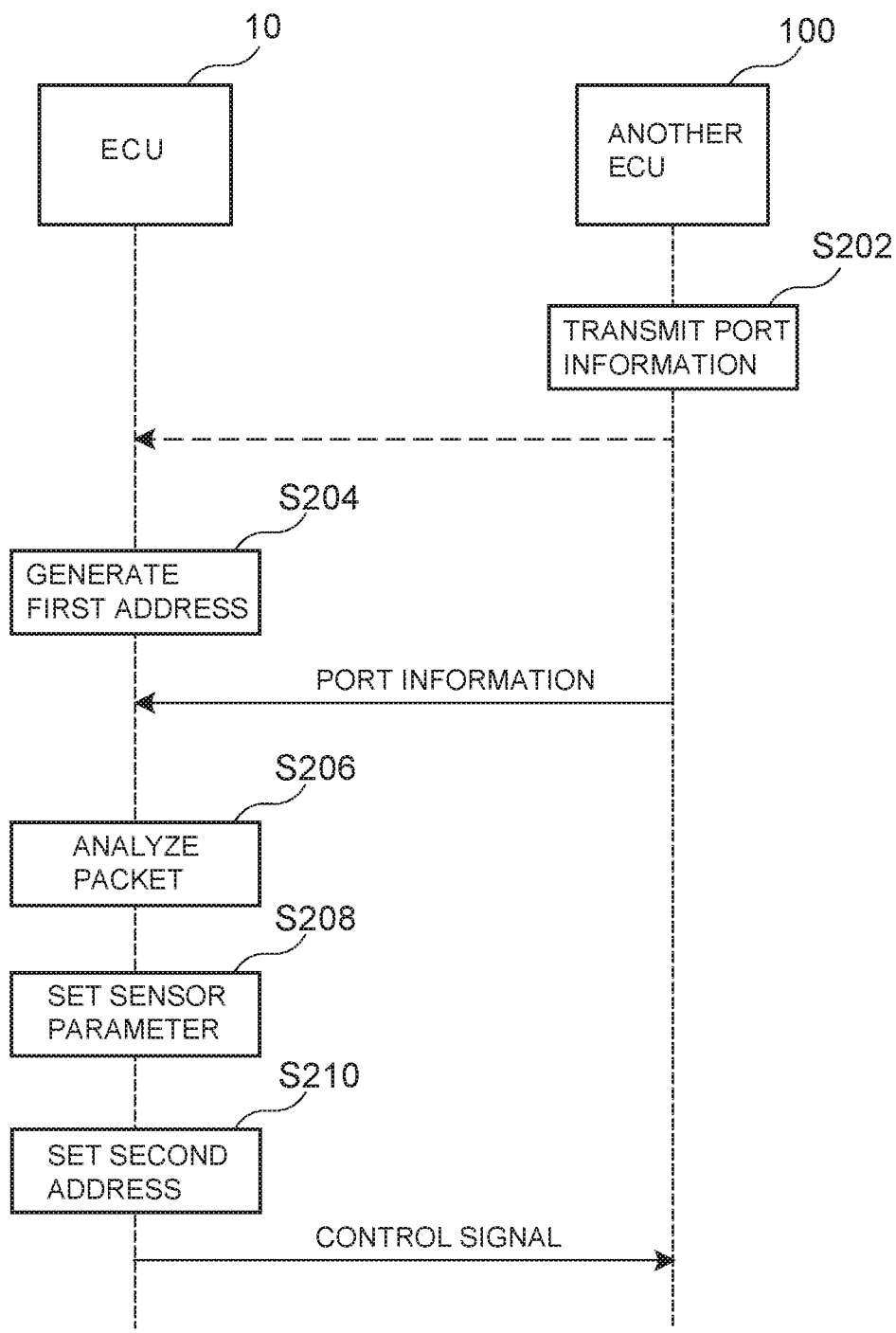

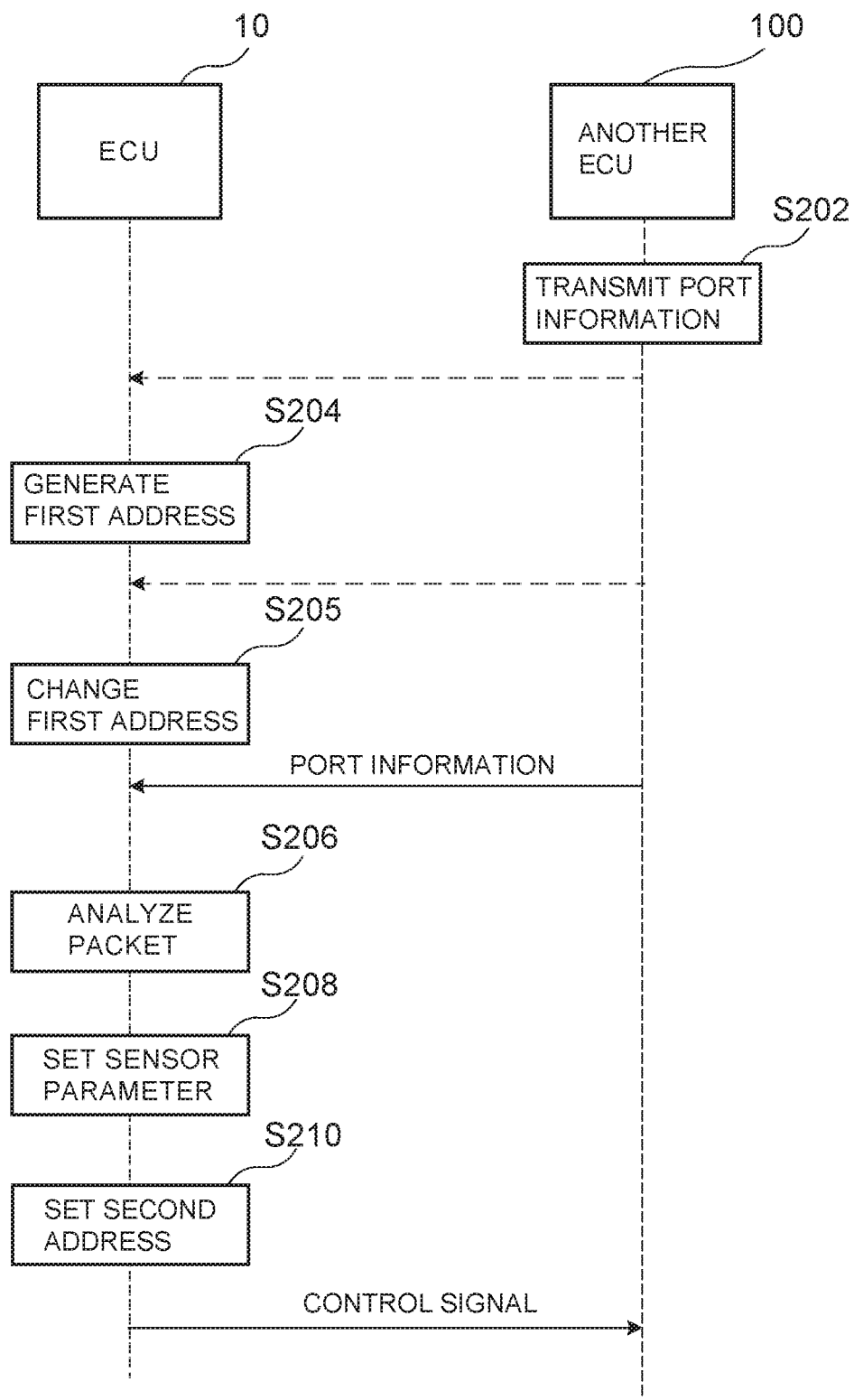

COMMUNICATION DEVICE AND METHOD FOR COMMUNICATION BETWEEN TWO CONTROL DEVICES IN A VEHICLE

CROSS-REFERENCE TO RELATED APPLICATION

This application claims priority under 35 USC 119 from Japanese Patent Application No. 2019-171418, filed on Sep. 20, 2019, the disclosure of which is incorporated by reference herein.

BACKGROUND

Technical Field

The present disclosure relates to a communication device for a vehicle and a communication method.

Related Art

Japanese Patent Application Laid-Open (JP-A) No. 2007-92640 discloses an onboard communication system in which, a master control section and respective slave control sections are connected by wire harnesses, and IDs are assigned automatically to the respective slave control sections by using the property that the resistance values differ in accordance with the wire lengths of the respective wire harnesses.

However, in the technique of JP-A No. 2007-92640, if wire harnesses having the same resistance values are used within a vehicle (network), an ID will be duplicated at slave control sections, and communication becomes impossible. Thus, a method using a computer network such as Ethernet or the like in communication at a communication device for a vehicle has also been contemplated. However, because unique addresses are not set at devices having the same part number, if a plurality of such devices are installed in a vehicle, the address will be duplicated by the address assigning rule. Namely, there is room for improvement in carrying out communication within a vehicle correctly.

SUMMARY

The present disclosure provides a communication device for a vehicle and a communication method that may enable communication within a vehicle to be carried out correctly, even in a case in which devices having the same part number are installed on an in-vehicle network.

A first aspect of the present disclosure is a communication device for a vehicle including: an address generating section that generates a first address for a time at which a first control device, which carries out control of a vehicle, communicates with a second control device; a communication section that communicates with the second control device via the first address, and receives information that specifies the first control device from the second control device; and an address setting section that sets a second address in place of the first address on the basis of the received information, the second address corresponds to an instrument that the first control device controls.

In the communication device for a vehicle of the first aspect, the first address, which shows the location of the first control device on the network, is generated by the address generating section. Due to the first address being generated, the first control device and the second control device communicate, and information that specifies the first control device is received by the communication section from the second control device. Due thereto, even in a case in which devices having the same part number are installed on the in-vehicle network, due to the first address being set by the address generating section, communication between the first control device and the second control device may be possible.

Further, on the basis of the information received at the communication section, the address setting section sets the second address in place of the first address. Here, the second address is an address that corresponds to the instrument that the first control device controls. In this way, the address setting section sets, as the second address, a correct address that corresponds to the instrument that the first control device controls. As a result, communication within the vehicle may be carried out correctly.

A second aspect of the present disclosure, in the above first aspect, the communication device may further include a parameter setting section that sets a parameter of the instrument on the basis of the information.

In the communication device for a vehicle of the second aspect, the instrument that the first control device controls is specified by the information received by the communication section. Therefore, the correct parameter of that equipment is set by the parameter setting section. Due thereto, the equipment may be controlled correctly by the first control device.

In a third aspect of the present disclosure, in the second aspect, the instrument may be a sensor that detects peripheral information of the vehicle.

In the communication device for a vehicle of the third aspect, the parameter, such as the detection viewing angle or the like, of the sensor may be set correctly.

In a fourth aspect of the present disclosure, in any one of the first through third aspects, the address generating section may generate the first address on the basis of a lot number that is assigned accompanying manufacturing of the first control device.

In the communication device for a vehicle of the fourth aspect, in a case in which control devices having the same lot number are not installed on the in-vehicle network, a unique address may be reliably generated.

In a fifth aspect of the present disclosure, in any one of the first through fourth aspects, the address generating section may generate the first address on the basis of a random number that is set in advance in accordance with a current time.

In the communication device for a vehicle of the fifth aspect, a unique address may be generated easily even in a case in which the first control device is not managed by the lot number.

In a sixth aspect of the present disclosure, in the fourth aspect or the fifth aspect, the communication device may further include a first address changing section that changes the first address in a case in which the first address that is generated by the address generating section is an address that is the same as another control device on the network.

In the communication device for a vehicle of the sixth aspect, in a case in which the first address, which is generated on the basis of the lot number or the current time, duplicates the address of another control device, the first address is changed by the first address changing section. Due thereto, duplication with an address of another control section may be avoided.

A seventh aspect of the present disclosure is communication method relating including: an address generating step of generating a first address for a time when a first control device, which carries out control of a vehicle, communicates with another second control device; a communication step of communicating with the second control device via the first address, and receiving information that specifies the first control device from the second control device; and an address setting step of setting a second address in place of the first address on the basis of the received information, the second address corresponds to an instrument that the first control device controls.

In the communication method of the seventh aspect, the first address, which shows the location of the first control device on the network, is generated in the address generating step. Further, in the communication step, information that specifies the first control device is received. Moreover, in the address setting step, the second address, which corresponds to the instrument that the first control device controls, is set on the basis of this information and in place of the first address. Due thereto, a correct address, which corresponds to the instrument that the first control device controls, may be set as the second address. As a result, communication within the vehicle may be carried out correctly.

In accordance with the communication device for a vehicle and the communication method relating to the present disclosure, communication within a vehicle is carried out correctly, even in a case in which devices having the same part number are installed on an in-vehicle network.

BRIEF DESCRIPTION OF THE DRAWINGS

Exemplary embodiments will be described in detail based on the following figures, wherein:

FIG. 3 is a sequence drawing showing an example of the flow of communication starting processing; and FIG. 4 is a sequence drawing showing another example of the flow of communication starting processing.

DETAILED DESCRIPTION

Figure 1:
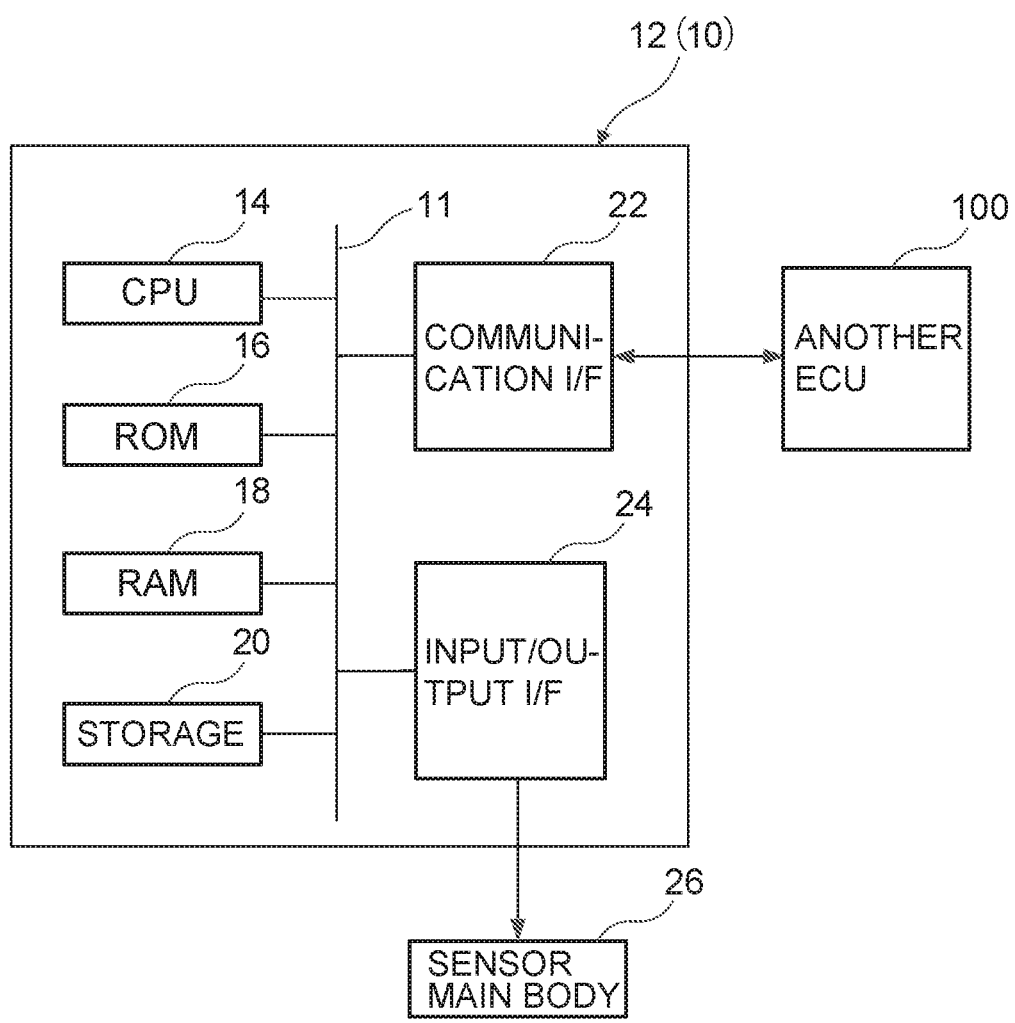
FIG. 1 is a block drawing showing hardware structures of an ECU of a communication device for a vehicle.

A communication device 12 for a vehicle relating to an embodiment is described with reference to the drawings. Note that the dimensions and proportions in the drawings are exaggerated for convenience of explanation, and there are cases in which they differ from actual dimensions and proportions.

As shown in FIG. 1, the communication device 12 for a vehicle of the present embodiment is a portion of an ECU (Electronic Control Unit) 10 that serves as the first control device. The ECU 10 is electrically connected to another ECU 100, which serves as the second control section, via a communication interface 22 that is described later, and an environment in which communication is possible is configured.

The another ECU 100 of the present embodiment is a central control device that carries out control of plural sensors that are installed in the vehicle, and is electrically connected to plural control devices including the ECU 10. Further, the another ECU 100 has plural ports for carrying out communication respectively with the control devices including the ECU 10. Instrument that are the destinations of connection are set in advance at the respective ports, and the another ECU 100 transmits port information to the respective control devices at predetermined timings.

The ECU 10 is structured to include a CPU (Central Processing Unit: a processor) 14, a ROM (Read Only Memory) 16, a RAM (Random Access Memory) 18, a storage 20, the communication interface 22 and an input/output interface 24. These respective structures are connected via a bus 11 so as to be able to communicate with one another. The CPU 14 is an example of the processor, and the RAM 18 is an example of the memory.

The CPU 14 is a central computing processing unit, and executes various programs and controls various sections. Namely, the CPU 14 reads-out programs from the ROM 16 or the storage 20, and executes the programs by using the RAM 18 as a workspace. The CPU 14 carries out control of the above-described respective structures and various computing processings in accordance with programs recorded in the ROM 16 or the storage 20.

The ROM 16 stores various programs and various data. The RAM 18 temporarily stores programs and data as a workspace. The storage 20 is structured by an HDD (Hard Disk Drive) or an SSD (Solid State Drive), and stores various programs including the operating system, and various data. In the present embodiment, a communication starting program, which is for starting communication with the another ECU 100, and the like are stored in the ROM 16 or the storage 20.

The communication interface 22 is an interface for the ECU 10 to communicate with the another ECU 100 by a computer network, and standards of Ethernet or the like are used therefor. In the present embodiment, Ethernet standards are used.

A sensor main body 26 that serves as equipment that the ECU 10 controls is connected to the input/output interface 24. As an example, the sensor main body 26 of the present embodiment is a laser radar (LIDAR: Laser Imaging Detection and Ranging) that is installed at the vehicle transverse direction central portion of the front portion of the vehicle and that detects peripheral information of the vehicle. Further, laser radars are similarly installed also at the rear portion and the both side portions of the vehicle, respectively. Therefore, the communication cable that extends from the ECU 10 to the another ECU 100 is connected to the port of the another ECU 100 that corresponds to the sensor main body 26.

(Functional configurations of Communication Device 12 for Vehicle) The communication device 12 for a vehicle that structures the ECU 10 realizes various functions by using the above-described hardware resources. The functional configurations that are realized by the communication device 12 for a vehicle are described with reference to FIG. 2.

Figure 2:
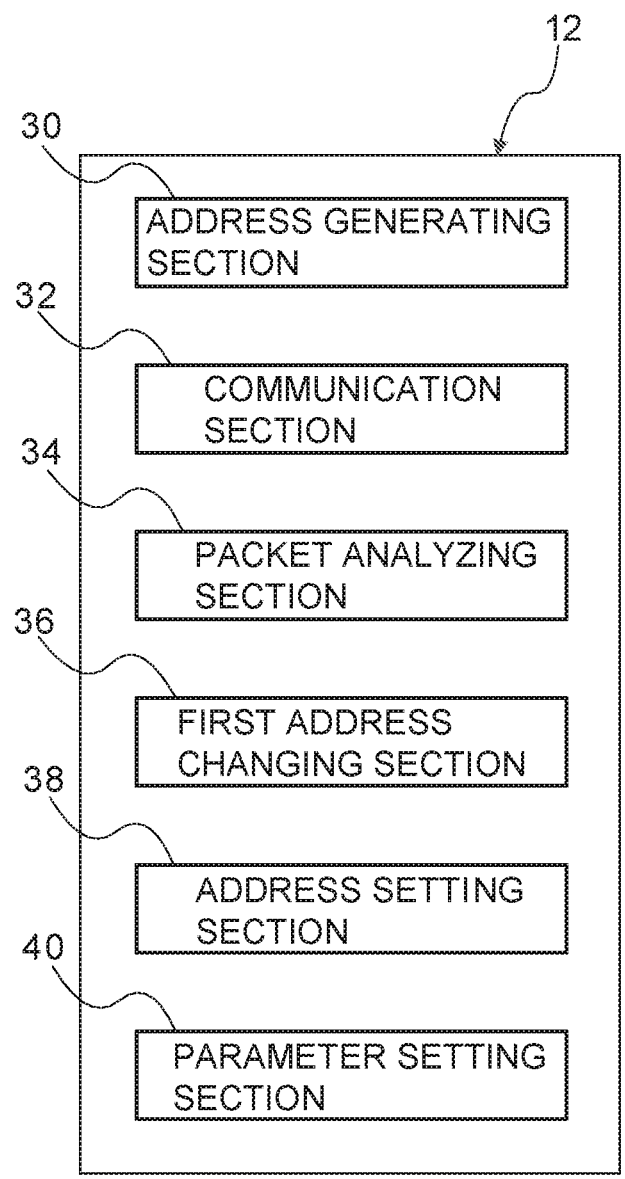
FIG. 2 is a block drawing showing an example of functional configurations of the communication device for a vehicle.

As shown in FIG. 2, the communication device 12 for a vehicle is configured to include, as the functional configurations thereof, an address generating section 30, a communication section 32, a packet analyzing section 34, a first address changing section 36, an address setting section 38, and a parameter setting section 40. These respective functional configurations are realized due to the CPU 14 reading-out a program that is stored in the ROM 16 or the storage 20, and executing the program by using the RAM 18 as a workspace.

The address generating section 30 generates a first address that shows the location on the network at the time when the ECU 10 communicates with the another ECU 100. Note that what are called first address and second address that is described later are both IP addresses, but are not limited to this and may be other addresses such as MAC addresses or the like.

The address generating section 30 generates the first address in accordance with a rule that is set in advance. As an example, the address generating section 30 of the present embodiment generates the first address on the basis of a lot number that is assigned accompanying the manufacturing of the ECU 10.

Note that, as another example of generating the first address by the address generating section 30, the first address may be generated on the basis of a random number that is set in advance in accordance with the current time. In this case, the current time at the time when the first address is generated is taken-in, and the current time is converted into a random sequence in accordance with a rule that is set in advance, and is decided upon.

The communication section 32 carries out communication with the another ECU 100 by the first address that is generated by the address generating section 30. Then, the communication section 32 receives, from the another ECU 100, information that specifies a first control device. In the present embodiment, as an example, the communication section 32 receives port information from the another ECU 100.

The packet analyzing section 34 analyzes the information (the packet) received from the another ECU 100. For example, the communication section 32 receives port information from the another ECU 100, and, due to this port information being analyzed, the port number to which the ECU 10 is connected is made clear. Then, because the equipment that is the destination of connection is set in advance at each port of the another ECU 100, if the port number that is connected is made clear, the position and the function of the sensor main body 26 that the ECU 10 controls is made clear.

In a case in which the first address that is generated by the address generating section 30 is the same address as another control device on the network, the first address changing section 36 changes the first address. For example, when the first address is duplicated such as in a case in which an ECU of the same lot number as the ECU 10 is connected to the another ECU 100, the first address changing section 36 changes the first address of the ECU 10 in accordance with a rule that is set in advance. The rule that is set in advance is, for example, the addition, subtraction, multiplication, integration or division of the host portion of the first address by a predetermined value.

Note that, in the present embodiment, as an example, in a case in which it is judged that a signal from the another ECU 100 has not been received during a given time period from the supplying of electric power to the ECU 10, it is judged that the first address is duplicated.

The address setting section 38 sets, instead of the first address and on the basis of the information of the another ECU 100 that is received by the communication section 32, a second address that corresponds to the sensor main body 26 that the ECU 10 controls. Concretely, due to the packet analyzing section 34 analyzing the information received from the another ECU 100, the position of placement to which the ECU 10 is connected is made clear. Further, the address setting section 38 sets, as the second address, an individual address for specifying the sensor main body 26 that corresponds to this position of placement. Namely, in the present embodiment, the individual address of the laser radar, which is installed at the vehicle transverse direction central portion of the front portion of the vehicle and which detects peripheral information of the vehicle, is set as the second address.

Note that the individual addresses of the equipment that include the sensors that are installed in the vehicle are stored in advance in the ROM 16 or the storage 20, and the port numbers and the individual addresses are associated with one another.

The parameter setting section 40 sets a parameter of the sensor main body 26 on the basis of information that specifies the first control device. Namely, in the present embodiment, a table that shows the relationships of correspondence between the parameter of the sensor main body 26, the port number, and the second address is stored in the ROM 16 or the storage 20. The parameter setting section 40 refers to this table, and sets the parameter of the laser radar for the sensor main body 26.

Note that what is called parameter here is a parameter such as the viewing angle of the sensor, or the like. Further, there is no need to make the port information and the parameters directly correspond to one another. For example, a table, which expresses the relationships of correspondence between the position of placement of the sensor main body 26 (the ECU 10) and the parameter of the sensor main body 26, may be prepared, and the parameter of the sensor main body 26 may be set by referring to this table.

(Operation)

Operation of the present embodiment is described next.

(Example of Communication Starting Processing) FIG. 3 is a sequence drawing showing an example of the flow of communication starting processing by the communication device 12 for a vehicle. Here, as an example, description is given of the communication starting processing at the time when electric power is supplied to the ECU 10 and the another ECU 100 in the state in which assembly of the vehicle has been completed.

In step S202, port information is transmitted from the another ECU 100. The port information that is transmitted from the another ECU 100 is information relating to the port number to which the ECU 10 is connected. Information relating to port numbers is similarly transmitted also to other ECUs that are connected to the respective ports of the another ECU 100.

Here, a case in which an ECU that has the same part number as the ECU 10 is connected on the in-vehicle network is considered. In this case, the default address is the same address at the ECU 10 and the another ECU. As shown in FIG. 3, there is a state in which communication is not established and port information from the another ECU 100 cannot be received normally.

In step S204, the CPU 14 of the ECU 10 generates a first address by the function of the address generating section 30 (generating step). As described above, in the present embodiment, the first address is generated on the basis of the lot number that was assigned accompanying the manufacturing of the ECU 10. At this time, in a case in which an ECU of the same lot does not exist on the in-vehicle network, the first address is a unique address. Further, even in a case in which an ECU of the same lot exists on the in-vehicle network, at the point in time when the ECU 10 precedingly generates the first address, this first address is a unique address.

Due to the first address being a unique address, the ECU 10 receives the port information transmitted from the another ECU 100. Concretely, the CPU 14 carries out communication with the another ECU 100 by the function of the communication section 32, and receives the port information (communication step).

Next, in step S206, by the function of the packet analyzing section 34, the CPU 14 analyzes the port information received from the another ECU 100. Due thereto, the port number to which the ECU 10 is connected is made clear.

In step S208, the CPU 14 sets the parameter of the sensor main body by the function of the parameter setting section 40. In the present embodiment, the parameter of the laser radar is set for the sensor main body 26 with reference to the table that shows the relationships of correspondence between the port number and the parameter of the sensor main body 26. Concretely, by the function of the parameter setting section 40, the CPU 14 sets a parameter, such as the detection viewing angle of the laser radar that is at the vehicle transverse direction central portion of the front portion of the vehicle, or the like, as the parameter of the sensor main body 26. Due thereto, the sensor main body 26 can be made to function as the laser radar at the vehicle transverse direction central portion of the front portion of the vehicle.

In step S210, the CPU 14 sets the second address in place of the first address by the function of the address setting section 38 (address setting step). The second address is an individual address of the laser radar that is the sensor main body 26. Therefore, communication of control signals between the ECU 10 and the another ECU 100 can be carried out by this address.

As described above, in the present embodiment, even in a case in which vehicle communication devices (ECUs) that have the same part number are installed on an in-vehicle network, due to a unique first address being set by the address generating section 30, the ECU 10 and the another ECU 100 can carry out communication. As a result, as compared with a structure in which the vehicle is assembled with ECUs of different part numbers installed, there is no need to consider the part numbers of the ECUs at the time of assembly, and management can be carried out easily, and the parts costs and manufacturing costs can be reduced.

Further, on the basis of the port information received at the communication section 32, the address setting section 38 of the present embodiment sets the second address, which corresponds to the sensor main body 26 that the ECU 10 controls, in place of the first address. By doing so, a correct address can be set as the second address by the address setting section 38, and communication within the vehicle can be carried out correctly.

Moreover, in the present embodiment, because the sensor main body 26 that the ECU 10 controls is specified by the port information, the correct parameter of the sensor main body 26 can be set by the parameter setting section 40. Namely, a parameter, such as the detection viewing angle or the like, of the sensor main body 26 can be set correctly. Due thereto, equipment can be controlled correctly by the ECU 10.

Still further, in the present embodiment, in a case in which ECUs of the same lot number are not installed on the in-vehicle network, a unique first address can be generated reliably.

Note that the present embodiment describes the communication starting processing in a case in which the first address does not duplicate the address of another ECU on the in-vehicle network. However, the present disclosure is not limited to this. For example, in a case in which the first address duplicates the address of another ECU, the communication starting processing that is shown in FIG. 4 may be carried out.

(Another Example of Communication Starting Processing) FIG. 4 is a sequence drawing showing another example of the flow of communication starting processing by the communication device 12 for a vehicle. Note that steps that carry out proces sings similar to those of the previous embodiment are denoted by the same numbers.

In step S202, port information is transmitted from the another ECU 100. The port information that is transmitted from the another ECU 100 is information relating to the port number to which the ECU 10 is connected. Information relating to port numbers is similarly transmitted also to other ECUs that are connected to the respective ports of the another ECU 100.

In a case in which an ECU that has the same part number as the ECU 10 is connected on the in-vehicle network, the default address is the same address at the ECU 10 and the another ECU, and communication is not established.

In step S204, the CPU 14 generates a first address by the function of the address generating section 30. In the present modified example, the address generating section 30 generates the first address on the basis of a random number that is set in advance in accordance with the current time.

Here, a case in which the first address that is generated by the address generating section 30 duplicates the address of another ECU on the in-vehicle network is considered. In this case, there is a state in which the ECU 10 and the another ECU 100 cannot communicate, and the ECU 10 cannot receive port information from the another ECU 100.

In such a state, in the present modified example, in step S205, the CPU 14 changes the first address by the function of the first address changing section 36. Namely, in a case in which signals from the another ECU 100 cannot be received during a predetermined time period from after the supplying of electric power to the ECU 10, it is judged that the first address is duplicated, and the first address is changed. The first address is changed in accordance with a rule that is set in advance. For example, the first address may be changed with reference to both the current time and the lot number. Further, the first address changing section 36 may repeatedly change the first address until a unique first address is set.

Due to a unique first address, being set, the sequence moves on to the processings of step S206 and steps thereafter. Because the processings of step S206 and steps thereafter are similar to those of the above-described embodiment, description thereof is omitted.

As described above, in the present modified example, even in a case in which an ECU of the same lot number as the ECU 10 is installed on the in-vehicle network, a unique first address can be generated easily.

An embodiment and a modified example have been described above, but the present disclosure can, of course, be embodied in various forms within a scope that does not depart from the gist thereof. For example, in the above-described embodiment and modified example, the first address is generated on the basis of the lot number or the current time, but the present disclosure is not limited to this. For example, the first address may be generated on the basis of the serial number that is set at the time of manufacturing, or the like.

Further, the above-described embodiment and modified example describe a laser radar, which is installed at the vehicle transverse direction central portion of the front portion of the vehicle, as an example of the sensor main body. However, the present disclosure is not limited to this. For example, the present disclosure may be applied to a control device that controls another sensor that is provided at an outer peripheral portion of the vehicle. Namely, the present disclosure may be applied to a communication device that structures a portion of a control device that controls a sensor such as an ultrasonic wave sensor, an optical camera, a millimeter wave radar, or the like. Further, the present disclosure is not limited to sensors, and may be applied to control devices that control other equipment such as lights or the like.

Moreover, in the above-described embodiment and modified example, Ethernet® is used as the standards of communication by the computer network. However, the present disclosure is not limited to the same. Namely, the present disclosure may be applied to an in-vehicle network that is constructed in accordance with another communication standard, provided that it is a communication standard in which addresses, which express location on the network at the time of communication between control devices, can be duplicate.

Still further, in the above-described embodiment and modified example, the parameters of the sensor main body 26 are stored in the ROM 16 or the storage 20 of the ECU 10. However, the present disclosure is not limited to this. For example, a structure may be employed in which the parameters of the sensor main body 26 are stored in a storage region at the exterior of the ECU 10. In this case, by receiving port information from the another ECU 100 by the communication section 32, the sensor main body 26 that the ECU 10 controls is made clear, and thereafter, the parameter setting section 40 may acquire the parameter of the sensor main body 26 from the storage region at the exterior of the ECU 10.

Further, any of various types of processors other than a CPU may execute the communication starting processing that the CPU 14 executes by reading-in software (a program) in the above-described embodiment and modified example. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the communication starting processing may be executed by one of these various types of processors, or may be executed by combining two or more of the same type or different types of processors (e.g., plural FPGAs, or a combination of a CPU and an FPGA, or the like). The hardware structures of these various types of processors are, more concretely, electrical circuits that combine circuit elements such as semiconductor elements and the like.

Moreover, although the storage 20 is used as the recording section in the above-described embodiment and modified example, the present disclosure is not limited to this. For example, a recording medium such as a CD (Compact Disk), a DVD (Digital Versatile Disk), a USB (Universal Serial Bus) memory, or the like may be used as the recording section. In this case, various types of programs may be stored on these recording media.

What is claimed is:

1. A communication device for a vehicle, comprising:
a memory; and
a processor coupled to the memory, the processor being configured to:
generate a first address, based on a lot number that is assigned in conjunction with manufacture of a first control device configured to control the vehicle, for a time that the first control device communicates with a second control device;
communicate with the second control device via the first address, and receive information that specifies the first control device from the second control device; and
set a second address in place of the first address based on the received information, the second address corresponding to an instrument that the first control device controls.

2. The communication device for the vehicle of claim 1, wherein the processor is configured to set a parameter of the instrument based on the received information.

3. The communication device for the vehicle of claim 1, wherein the processor is configured to change the first address, in a case where the first address that is generated is the same as an address of another control device on the network.

4. The communication device for the vehicle of claim 2, wherein the instrument is a sensor configured to detect peripheral information of the vehicle.

5. The communication device for the vehicle of claim 2, wherein the processor is configured to generate the first address based on a random number that is set in advance in accordance with a current time.

6. The communication device for the vehicle of claim 3, wherein the processor is configured to change the first address, by adding, subtracting, multiplying, integrating or dividing a host portion of the first address by a predetermined value.

7. The communication device for the vehicle of claim 4, wherein the processor is configured to generate the first address based on a random number that is set in advance in accordance with a current time.

8. A communication device for a vehicle, comprising:
a memory; and
a processor coupled to the memory, the processor being configured to:
generate a first address, based on a random number that is set in advance in accordance with a current time, for a time that a first control device configured to control the vehicle communicates with a second control device;
communicate with the second control device via the first address, and receive information that specifies the first control device from the second control device; and
set a second address in place of the first address based on the received information, the second address corresponding to an instrument that the first control device controls.

9. The communication device for the vehicle of claim 8, wherein the processor is configured to change the first address, in a case where the first address that is generated is the same as an address of another control device on the network.

10. The communication device for the vehicle of claim 9, wherein the processor is configured to change the first address, by adding, subtracting, multiplying, integrating or dividing a host portion of the first address by a predetermined value.

11. A communication method comprising, by a processor:
generating a first address, based on a lot number that is assigned in conjunction with manufacture of a first control device configured to control a vehicle, for a time when the first control device communicates with a second control device;

communicating with the second control device via the first address, and receiving information that specifies the first control device from the second control device; and setting a second address in place of the first address based on the received information, the second address corresponding to an instrument that the first control device controls.

* * * * *